US005497009A

United States Patent [19]

Torikoshi et al.

[11] Patent Number: 5,497,009

[45] Date of Patent: Mar. 5, 1996

[54] PHOTOELECTRIC SMOKE SENSOR AND FIRE DETECTING SYSTEM, AND SENSITIVITY TESTING METHOD THEREFOR

[75] Inventors: Yasuo Torikoshi; Naoki Kosugi; Tetsuya Nagashima, all of Tokyo, Japan

[73] Assignee: Hochiki Corporation, Tokyo, Japan

[21] Appl. No.: 329,906

[22] Filed: Oct. 27, 1994

[30] Foreign Application Priority Data

Oct. 29, 1993 [JP] Japan .................................... 5-271134
May 6, 1994 [JP] Japan .................................... 6-094087

[51] Int. Cl.[6] ............................ G01N 15/06; G08B 17/10

[52] U.S. Cl. ........................... 250/574; 340/630; 356/438

[58] Field of Search ..................................... 250/573, 574, 250/575, 564, 565; 340/628, 630; 356/436–438

[56] References Cited

U.S. PATENT DOCUMENTS

Re. 34,704 8/1994 Cole ........................................ 340/630
4,232,307 11/1980 Marsocci ................................. 250/574
4,317,113 2/1982 Honma .................................... 250/573
4,647,785 3/1987 Morita ..................................... 250/574
4,749,871 6/1988 Galvin et al. ........................... 250/573
4,827,247 5/1989 Giffone .................................. 340/630

*Primary Examiner*—Stephone B. Allen
*Attorney, Agent, or Firm*—Sughrue, Mion, Zinn, Macpeak & Seas

[57] ABSTRACT

A photoelectric sensor of the present invention includes a light emitting device and a light receiving device for detecting scattered light due to smoke, a light emitting confirming device which lights up when a quantity of light received by the light receiving device is greater than or equal to a threshold and a test light emitting device for emitting light to the light receiving device during the test, wherein a blinking of the light emitting confirming device is started at a time of a test start, and a quantity of light received by the light receiving device is increased in steps so that the blinking is stopped when the quantity is greater than or equal to the threshold. Accordingly, the sensitivity test can be performed by visually counting the number of blinkings of the light emitting device.

23 Claims, 10 Drawing Sheets

PHOTOELECTRIC SMOKE SENSOR AND FIRE DETECTING SYSTEM, AND SENSITIVITY TESTING METHOD THEREFOR

BACKGROUND OF THE INVENTION

1. Field of the Invention

The present invention relates to a photoelectric smoke sensor having a light emitting device and light receiving device for detecting light scattered by smoke particles, and a fire detecting system including a plurality of the sensor, and more particularly to a sensitivity test of a photoelectric smoke sensor.

2. Description of the Related Art

FIG. 7 shows a general photoelectric smoke detector, in which a smoke detection chamber 2 is formed by a plurality of labyrinth members 1 so that light does not enter from the outside but smoke flows in from outside. A light emitting surface of a light emitting device (LED) 3 and a light receiving surface of a light receiving device 4 are arranged in the smoke detection chamber 2 so that light emitted from the light emitting device 3 is not directly reccived but scattered light 6 due to smoke particles 5 can be received by the light receiving device 4. Further, a light emitting surface of a light emitting device 7 for testing is arranged in the smoke detection chamber 2 in face-to-face relation to the light receiving surface of the light receiving device 4 so as to produce pseudo-scattered light. Further, operation confirmation device 8 is provided so as to project to the outside of this smoke sensor.

In such an arrangement, as shown in FIG. 8(*a*), if there are no smoke particles 5 in the smoke detection chamber 2, an output V of the light receiving device 4 is based only on the diffusively reflected light from the labyrinth member 1 and the like as well as dark current. Accordingly, the output V remains at the lowest level. The voltage of the output in this condition is so-called 0-point level voltage. As smoke flows into the smoke detection chamber 2 and the quantity of scattered light 6 (that is, smoke density D) increases due to the smoke particles 5, the output V becomes proportionally higher. Accordingly, an arrangement can be provided such that in an initial state in which the interior of the smoke detection chamber 2 has not been fouled, an alarm signal is outputted to a control panel (not shown) when the output of the light receiving device 4 exceeds a threshold value Vmin. corresponding to a threshold value Dmin. of the smoke density which is the minimum value of the allowable range of the sensitivity of the sensor, as shown by the solid line in FIG. 8(*a*).

In addition, when a test is conducted by using the light emitting device 7 for testing, it is possible to carry out an operation test for confirming the operation of the sensor by causing the light emitting device 3 for smoke detection to emit light, and by causing the light emitting device 7 for testing to emit light at an operational level corresponding to a smoke density Dt which is greater than or equal to the aforementioned threshold value Dmin.

When the interior of the smoke detection chamber 2 becomes fouled, the overall output V of the light receiving device 4 becomes high, as shown by the broken line in FIG. 8(*a*), and even if the smoke density is less than or equal to the threshold value Dmin., the output V of the light receiving device 4 becomes greater than or equal to the threshold value Vmin., thereby outputting an alarm signal.

Accordingly, it is necessary to conduct a non-operation test in this type sensor in addition to the above-mentioned operation test. For example, as shown in FIG. 8(*b*), an operation test value Dt of the smoke density is set to be slightly smaller than the maximum value Dmax. of the allowable range Dw of sensitivity. The light emitting device 7 emits light at a level corresponding to the value Dt to conduct the operation test in order to confirm the operation of the sensor. In addition, a non-operation test value Df is set to be slightly smaller than the minimum value Dmin. of the allowable range Dw of sensitivity. The light emitting device 7 emits light at a level corresponding to the value Df to conduct the non-operation test in order to confirm the non-operation of the sensor.

At the operation test value Dr, since the output voltage Vt1 and Vt2 corresponding to the initial sensitivity characteristic and the sensitivity deviation characteristic respectively, exceed a alarm output minimum level Vmin., the operation of the sensor can be confirmed at both output voltage. On the other hand, at the non-operation test value Dr, the output voltage Vf1 corresponding to the initial sensitivity characteristic does not exceed the alarm output minimum level Vmin., whereby the non-operation test can be conducted. However, since the output voltage Vf2 corresponding to the sensitivity deviation characteristic exceeds the alarm output minimum level Vmin., the non-operation test can not be conducted.

For example, the operation and non-operation test of the sensor are conducted in a manner as shown in FIG. 9. In a smoke sensor 106 which is mounted on a ceiling, a reed switch for operation 105 and a reed switch for non-operation 104 is provided diagonally. An inspector 101 brings a test pole 102 to come near the smoke sensor 106. First, the inspector 101 moves the test pole 102 so that a magnet 103 come near the reed switch for operation to conduct the operation test. Second, the inspector 101 moves the test pole 102 to rotate in the direction of an arrow in the drawing so that the magnet 103 come near the reed switch for non-operation to conduct the non-operation test.

However, when the non-operation test is conducted at or below the operational level, a setting must be provided such that the quantity of light emitted by the light emitting device 7 for testing is slightly lower than at the operational level, as shown in FIG. 8(*b*). However, there is a problem in that it is difficult to provide an accurate setting such that the quantity of light emitted by the light emitting device 7 for testing is slightly lower than at the operational level, because of the diffusively reflecting structure in the smoke detection chamber 2 and variations in circuit components.

In addition, variable resistors are required to adjust separately the level in order to accurately set this level, resulting in higher cost. Furthermore, since two test operations are carried out including the operation test and the non-operation test, there is a problem in that much time is required when tests are conducted on each of a multiplicity of sensors installed in a large monitoring area.

Moreover, as another conventional testing method, a conceivable method is that output terminals, such as a connector and a jack, are provided in advance for directly fetching the output V of the light receiving device 4 to an external circuit, and the output V (the so-called 0-point level) when smoke is not present in the smoke detection chamber 2 is measured. With this method, however, output terminals and a measuring instrument are required, and the inspector must engage in an operation at high places where the sensors are installed. Additionally, since output terminals for testing and openings therefor have to be provided separately, there is a problem in that the sensors are affected by external noise such as electromagnetic waves, corrosion, aged deterioration, and the like.

SUMMARY OF THE INVENTION

In view of the above-described conventional problems, an object of the present invention is to provide a photoelectric smoke sensor and a fire detecting system, and a sensitivity testing method therefor which make it possible to conduct the operation test and the non-operation test in detail through a simple operation and in a short time.

A photoelectric smoke sensor of the present invention comprises: a first light emitting device for emitting light to detect scattered light due to smoke; first light receiving device for receiving the scattered light due to smoke; second light emitting device for lighting continuously when a quantity of light received by the light receiving device is equal to or more than a threshold; sensitivity test starting device for starting a sensitivity test of the photoelectric smoke sensor; third light emitting device for blinking with a predetermined period to emit light to the light receiving device; blinking starting device for starting to blink the second light emitting device when the test is started; increment device for increasing in steps a quantity of light received by the light emitting device; comparison device for comparing a threshold with the quantity of light received by the light emitting device; and lighting continuing device for stopping the blinking of the second light emitting device to continue the lighting of the second light emitting device when the quantity of light received by the light receiving device is greater than or equal to the threshold value.

In the present invention, the inspector can start a test on a noncontact basis by using an inspecting magnet, a light emitting device, radio waves, or the like. After the light emitting device for confirming operation starts blinking, the quantity of light emitted by the light emitting device for testing increases in steps. When the quantity of light received by the light receiving device for smoke detection is greater than or equal to a threshold value, the blinking of the light emitting device for confirming operation stops. Accordingly, in the event that the interior of the smoke detection chamber becomes fouled, and the quantity of light received by the light receiving device for smoke detection increases, the number of blinking of the light emitting device for confirming operation differs from an allowable number of blinking in a normal state. Hence, it is possible to conduct the operation test and the non-operation test in a single test operation, and to conduct the operation test and the non-operation test in detail through a simple operation and in a short time.

In addition, in a case where the light receiving device for smoke detection is made to blink with a relatively long period during smoke detection, the light receiving device for smoke detection and the light emitting device for testing are made to blink with a relatively short period during test, whereby it is possible to conduct the test in a short time even if a multiplicity of sensors installed in a large monitoring area are tested one at a time.

Further, a sensitivity testing method of the present invention for a photoelectric smoke sensor of a fire detecting system, the system having a plurality of photoelectric smoke sensors each of which includes a light emitting device and light receiving device for detecting scattered light due to smoke and a test light emitting device for emitting light to the light receiving device during the sensitivity test, and a control panel for controlling the plurality of sensors, the method comprises the steps of: selecting one sensor to which a sensitivity test is conducted from the plurality of sensors; transmitting a test command from the control panel to the selected one sensor; increasing in steps a quantity of light emitted by the light emitting device when the test command is received by the sensor; transmitting an alarm signal from the sensor to the control panel when a quantity of light received by the light receiving device is greater than or equal to a threshold; measuring a time duration from the transmission of the test command by the control panel until the reception of the alarm signal by the control panel; and conducting the sensitivity test of the sensor based on the measured time in the control panel.

In a sensitivity testing method of the present invention for a photoelectric smoke sensor of a fire detecting system, a test is started on a noncontact basis by an external command from a fire alarm control panel. The quantity of light emitted by the light emitting device for testing is increased in steps on the photoelectric smoke sensor side. An alarm is issued to the fire alarm control panel if the quantity of light received by the light receiving device for smoke detection is greater than or equal to a threshold value, and the sensor is inspected on the fire alarm control panel side on the basis of the time duration from the transmission of the test command until the reception of an alarm signal. Accordingly, in the event that the interior of the smoke detection chamber of the sensor is fouled, and the quantity of light received by the light receiving device for smoke detection increases, the time duration until the issuance of the alarm differs from a predetermined allowable time duration. Hence, it is possible to conduct the operation test and the non-operation test on each of the plurality of sensors on the control panel side through a single test operation. In addition, it is possible to conduct the operation test and the non-operation test in detail through a simple operation and in a short time.

BRIEF DESCRIPTION OF THE DRAWINGS

In the accompany drawings,

FIG. 8(*b*) is an explanatory diagram illustrating a non-operation level of the general photoelectric smoke sensor;

DETAILED DESCRIPTION OF THE PREFERRED EMBODIMENTS

A detailed description of the preferred embodiments of the present invention will be described referring with the accompanying drawings as follows.

Figure 1:
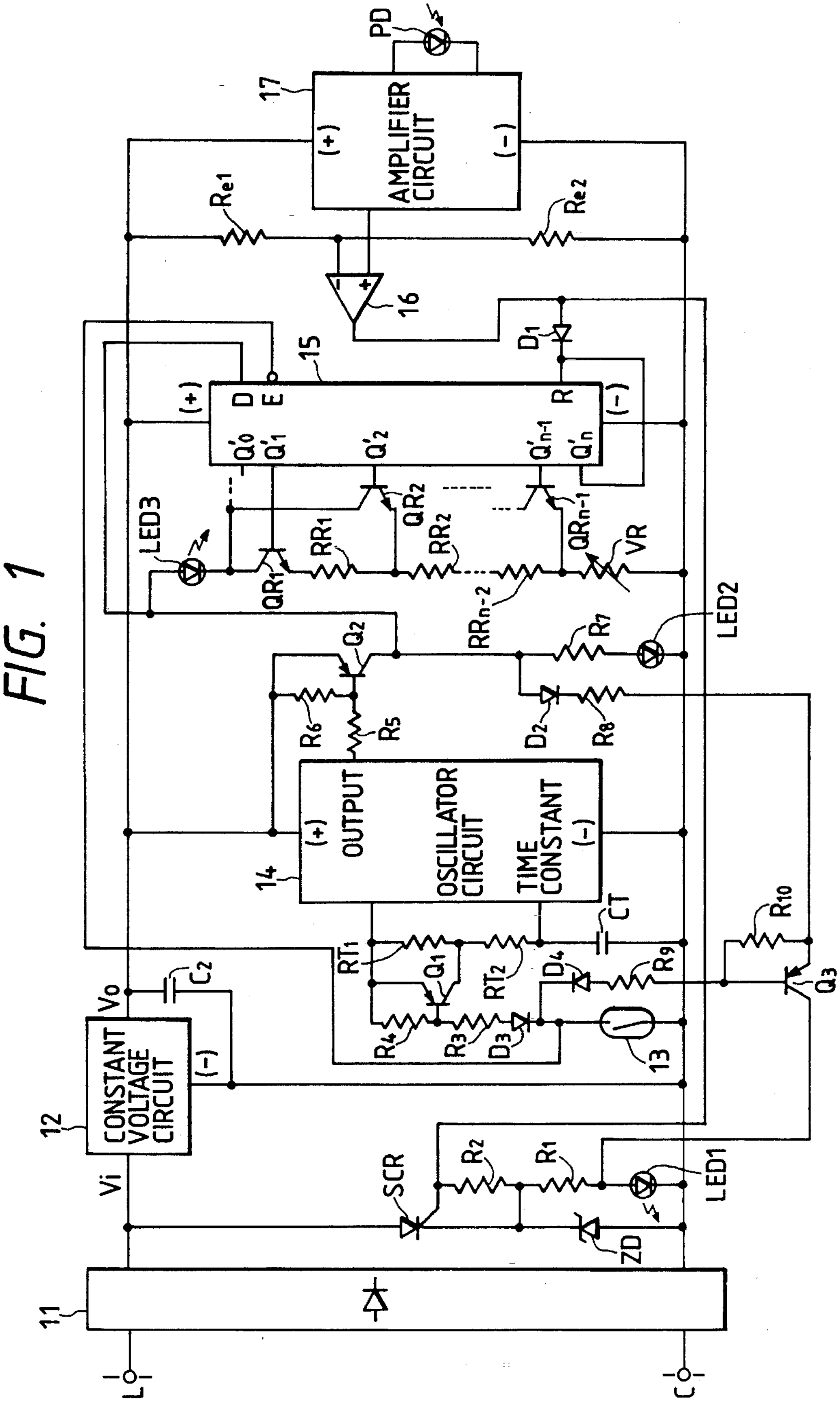
FIG. 1 is a circuit diagram illustrating an embodiment of a photoelectric smoke sensor in accordance with the present invention.

FIG. 1 is a circuit diagram illustrating an embodiment of a photoelectric smoke sensor in accordance with the present invention.

First, this photoelectric smoke sensor is comprised of a light emitting device LED2 and a light receiving device PD which are used for smoke detection and are arranged such that light emitted from the light emitting device is not directly received but scattered light 6 due to smoke particle 5 can be received by a light receiving device PD. Although not shown in FIG. 7, a light emitting device LED1 for confirming operation, which indicates that the sensor has operated to provide visual confirmation, as well as a testing reed switch 13, are provided. The testing reed switch 13 is turned on as the inspector brings a magnet (not shown) into close proximity to the same.

A line L and a common line C have their power supplied from an unillustrated control panel, and are connected to a diode bridge 11 so as to be nonpolarized. The + (plus) side (input voltage Vi) of the diode bridge 11 is connected to a constant voltage circuit 12 and an anode of a thyristor SCR. A cathode of the thyristor SCR is connected to one side of the diode bridge 11 via a zener diode ZD and is also connected to that side of the diode bridge 11 via a resistor R1 and the light emitting device LED1 for confirming operation.

One terminal of a resistor R2 and an output terminal of a comparator 16 are connected to a gate of a thyristor SCR, and the other end of the resistor R2 is connected between the cathode of the thyristor SCR and the resistor R1. Also, a collector of a transistor Q3 is connected between the resistor R1 and the light emitting device LED1 for confirming operation.

An output terminal (output voltage V0) of the constant voltage circuit 12 is smoothed by a capacitor C2, and is connected to respective power supply terminals of an oscillator circuit 14, a shift register 15, and a received light signal amplifier circuit 17, and is also connected to one terminal of a resistor R6 and an emitter of a transistor Q2 on the output side of the oscillator circuit 14 and to one terminal of a voltage diving resistor Re1.

A series circuit, which includes resistors RT1 and RT2 and a capacitor CT and serves as a time constant circuit for determining an oscillating frequency, is connected to the input side of the oscillator circuit 14. One terminal of the resistor RT1 is connected to an emitter of a transistor Q1 and one terminal of a resistor R4, while the other terminal of the resistor RT1 is connected to a collector of the transistor Q1. The other terminal of the resistor R4 is connected to a base of the transistor Q1, and is also connected to one terminal of the reed switch 13 and an negative logic enable terminal E of the shift register 15 via a resistor R3 and a diode D3. The other terminal of the reed switch 13 is connected to one side of the diode bridge 11, so that when the reed switch 13 is off, the transistor Q1 is in an off state, and the shift register 15 is in a disabled state.

The output terminal of the oscillator circuit 14 is connected to a base of the transistor Q2 via a resistor R5. A collector of the transistor Q2 is connected to an anode of the light emitting device LED3 for testing and a clock terminal D of the shift register 15, is also connected to – (minus) side of the diode bridge 11 via a resistor R7 and the light emitting device LED2, and is further connected to an emitter of the transistor Q3 and one terminal of a resistor R10 via a diode D2 and a resistor R8. A base of the transistor Q3 and the other terminal of the resistor R10 are connected between the diode D3 and the reed switch 13 via a resistor R9 and a diode D4.

A cathode of the light emitting device LED3 is connected to – (minus) side of the diode bridge 11 via a transistor QR1, ladder resistors RR1 to RRn-2, and a variable resistor VR, and is also connected to respective collectors of the transistors QR1 to QRn-1. Output terminals Q'1 to Q'n-1 of the shift resistor 15 are respectively connected to bases of the transistors QR1 to QRn-1, while an output terminal Q'n is connected to a reset terminal R. Emitters of the transistors QR1 to QRn-1 are respectively connected to junctions of the ladder resistors RR1 to RRn-2 and the variable resistor VR.

Accordingly, when the output terminals Q'1 to Q'n-1 of the shift register 15 are successively turned on, a combined resistance value of the ladder resistors RR1 to RRn-2 and the variable resistor VR is reduced in steps, so that the driving current of the light emitting device LED3 for testing increases in steps, and the quantity of light emitted thereby also increases in steps.

The detection signal of the light receiving device PD for smoke detection is amplified by the received light signal amplifier circuit 17. This amplified signal is compared by the comparator 16 by using as a reference the voltage divided by the voltage dividing resistors Re1 and Re2. An output terminal of the comparator 16 is connected to the reset terminal R of the shift register via a diode D1, and is connected to the gate of the thyristor SCR, as described before.

Next, a description will be given of the operation of the above-described embodiment. First, in a normal monitoring state in which the reed switch 13 is off, the oscillator circuit 14 oscillates with a relatively long period which is determined by the time constant circuit constituted by the resistors RT1 and RT2 and the capacitor CT. Hence, the transistor Q2 is turned on and off, and the light emitting device LED2 for smoke detection blinks on and off with this period.

Figure 7:
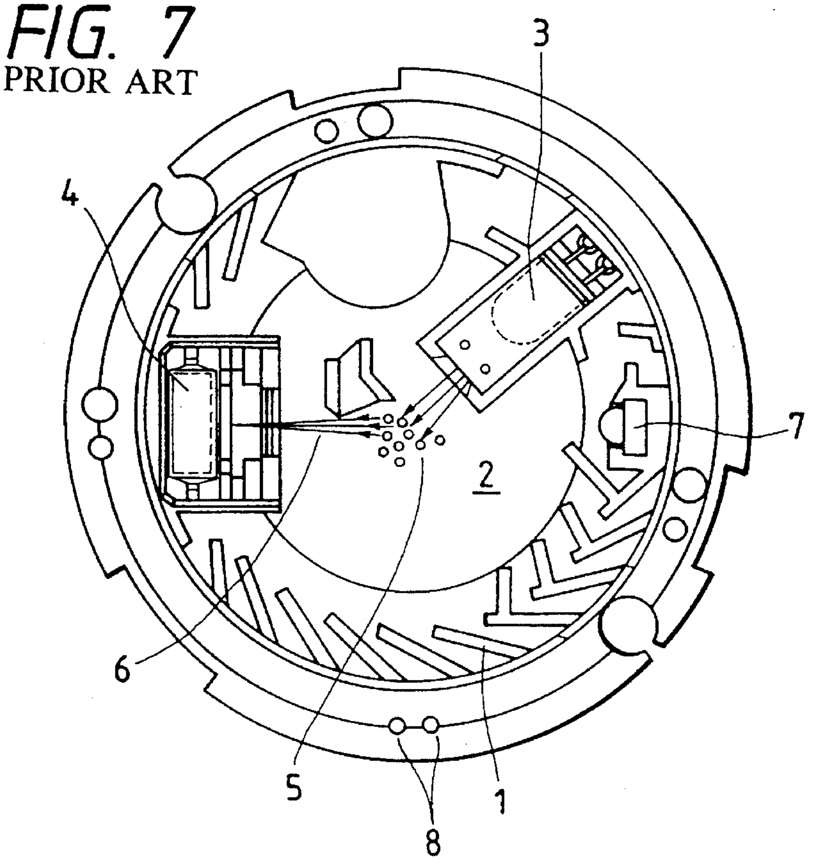
FIG. 7 PRIOR ART
FIG. 7 is a plan view illustrating a general photoelectric smoke sensor.
Figure 8A:
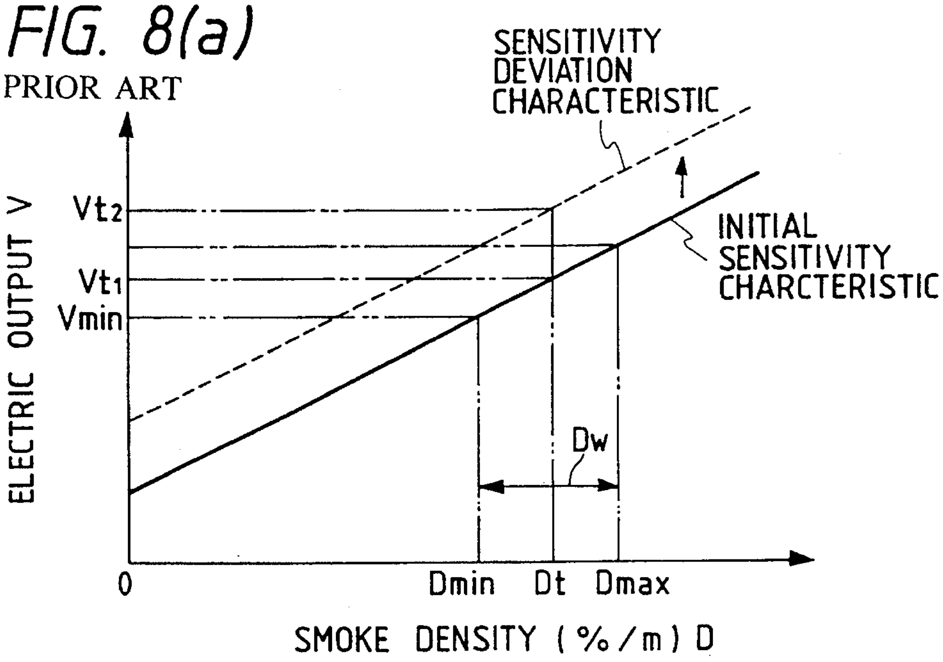
FIG. 8(a) PRIOR ART
FIG. 8(*a*) is an explanatory diagram illustrating sensitivity characteristics of the general photoelectric smoke sensor.
Figure 8B:
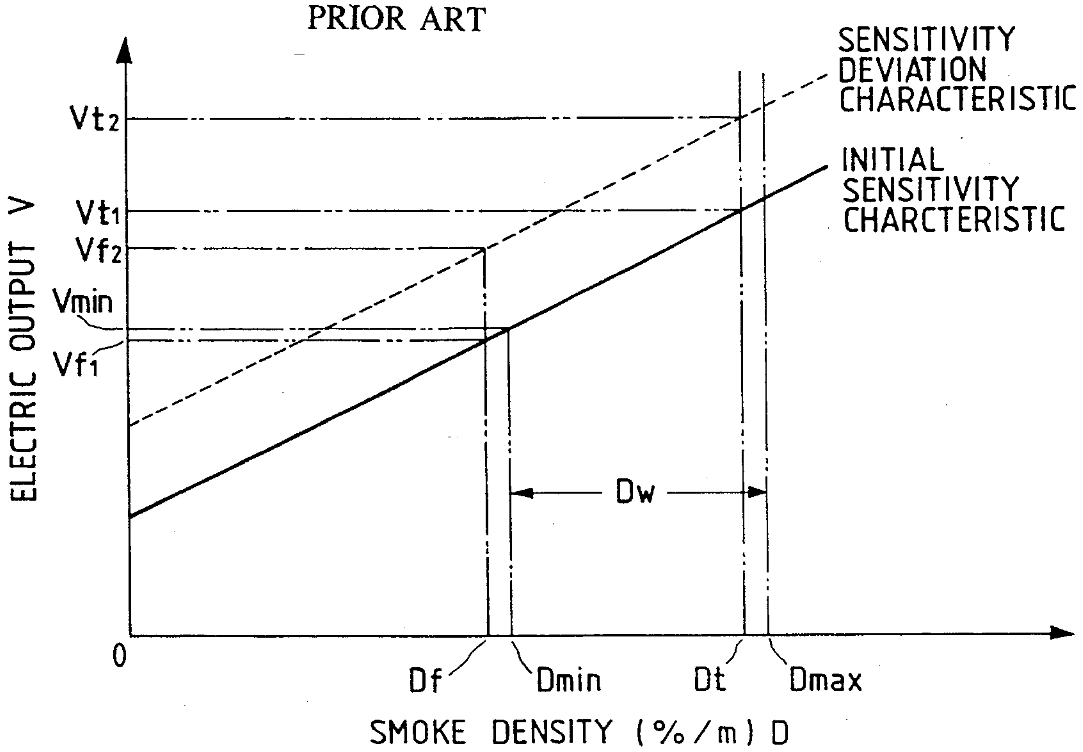
FIG. 8(b) PRIOR ART
Figure 9:
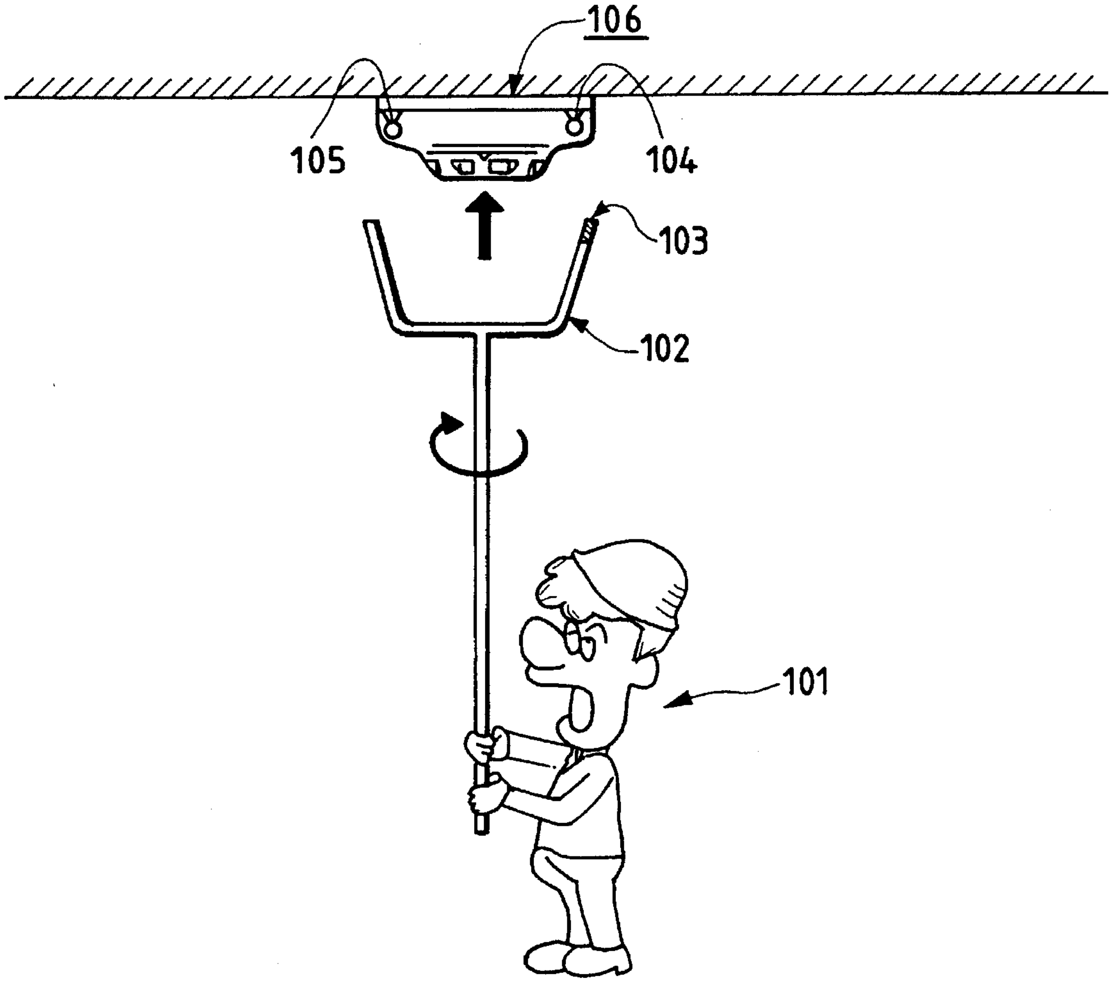
FIG. 9 is a explanatory view illustrating an example of the conventional method for conducting the operation and non-operation test of the sensor.

Then, when smoke flows into a smoke detection chamber 2 as shown in FIG. 7, the output of the light receiving device PD for smoke detection becomes higher in proportion to an increase in the quantity of scattered light 6 due to smoke particles 5. When a voltage corresponding to the quantity of the scattered light exceeds the reference voltage which is determined by the voltage dividing resistors Re1 and Re2, the thyristor SCR is turned on. Accordingly, current flows across the light emitting device LED1 for confirming operation, and this current is detected by the control panel as an alarm signal. When the thyristor SCR is turned on, an input voltage Vin of the constant voltage circuit 12 becomes a voltage close to zero (approx. 1 V), so that no power is supplied to the constant voltage circuit 12 and thereafter, and the oscillator circuit 14 does not oscillate. Hence, the light emitting device LED1 for confirming operation does not blink.

In such a state, when the inspector brings a magnet into close proximity to the testing reed switch 13 and the switch 13 is turned on, the transistor Q1 is turned on, so that the resistance value of the time constant circuit is derived from RT2 alone instead of RT1 and RT2. As a result, the period of oscillation of the oscillator circuit 14 becomes shorter. In addition, the transistor Q3 is similarly turned on, and the current also flows across the light emitting device LED1 for confirming operation, so that both this LED1 and the light emitting device LED2 for smoke detection start blinking on and off with this period.

Furthermore, when the shift register 15 is set in an enabled state, and the aforementioned oscillation output is inputted to a clock terminal D, the high level output at the output terminals shifts successively in the order of Q'0, Q'1, Q'2, . . . , Q'n-1, and Q'n. When the output has shifted to the output terminal Q'n, the shift register 15 is reset, and stops the shifting operation.

When the shift register 15 undergoes shifts in the above-described manner, the transistors QR1 to QRn-1 are successively turned on, the collector current at a transistor QRk (k=1, . . . , n-1) which is turned on, i.e., the forward current of the light emitting device LED for testing, increases in steps due to the ladder resistors RR1 to RRn-2 and the variable resistor VR. Accordingly, the quantity of light emitted by the light emitting device LED3 for testing increases in steps.

Then, when the light from the light emitting device LED3 for testing (and the light emitting device LED2 for smoke detection) is received by the light receiving device PD for detection, and the reference voltage determined by the voltage dividing resistors Re1 and Re2 is exceeded, the thyristor SCR is turned on. Hence, current flows across the zener diode ZD, and the light emitting device LED1 for confirming operation continues to be lit, and the shift register 15 is reset.

Figure 2:
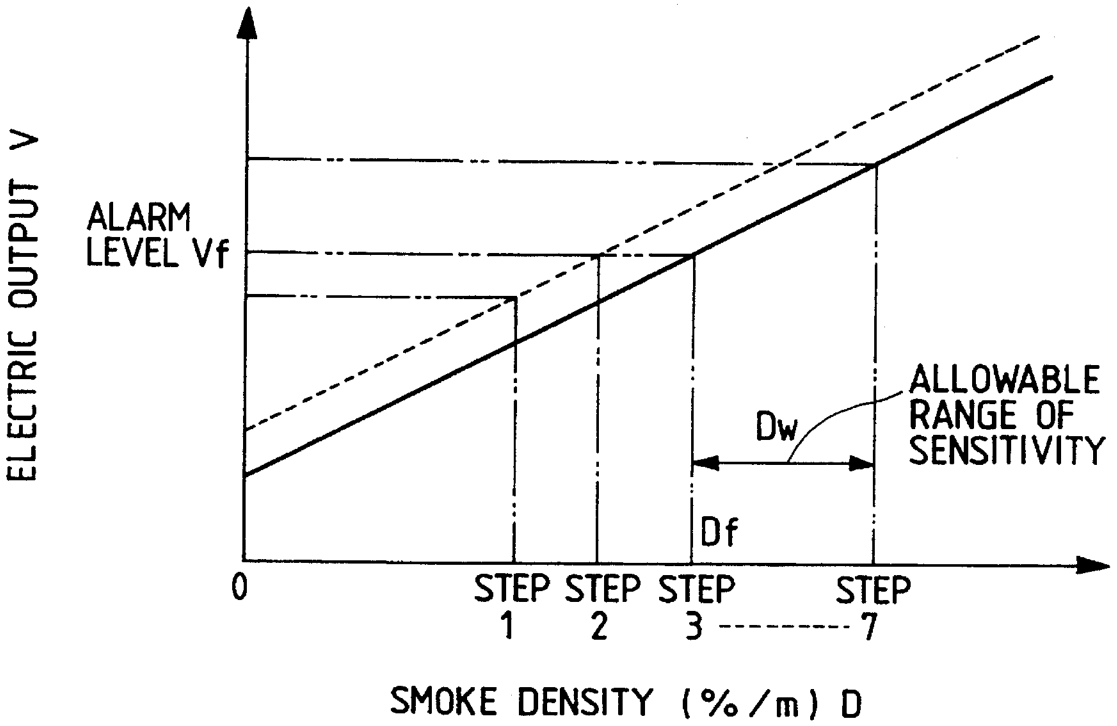
FIG. 2 is an explanatory diagram illustrating the test operation of the photoelectric smoke sensor shown in FIG. 1.

Accordingly, with the sensor having proper sensitivity as shown by the solid line in FIG. 2, if the quantity of light of the light emitting device LED for testing increases gradually, an alarm is issued at an alarm level Vf, so that the number of blinking (steps 4 to 7 in the drawing) of the light emitting device LED1 for confirming operation in this proper state can be set as a reference. On the other hand, in the event that the interior of the smoke detection chamber 2 becomes fouled, and the overall output V of the light receiving device PD is high, as shown by the broken line, even if the smoke density is less than or equal to a density threshold value Df, the output of the light receiving device PD becomes greater than or equal to the threshold value Vf, thereby outputting an alarm signal (steps 1 and 2 in the drawing). Accordingly, as the inspector visually counts the number of blinking of the light emitting device LED1 for confirming operation, it is possible to inspect through a single inspecting operation whether the sensitivity is within an allowable range. In addition, the non-operation test can also be conducted at the same time.

Furthermore, since even a slight deviation in sensitivity can be detected, it is possible to detect a low level of fouling, so that cleaning can be provided easily. In addition, the adjustment of the testing circuit can be effected easily by means of the variable resistor VR. Moreover, test can be carried out on a noncontact basis without providing in advance output terminals, such as a connector and a jack, for directly fetching the output of the light receiving device PD to an external circuit. Accordingly, it is unnecessary for the inspector to engage in an operation at high places where the sensors are installed, and the sensors are not affected by external noise such as electromagnetic waves, corrosion, aged deterioration, and the like due to the output terminals for testing and openings.

Here, in the above-described embodiment, in order to keep the reed switch 13 on continuously during test, the inspector must continuously hold a magnet in close proximity to the reed switch 13. However, if a holding circuit such as the one shown in FIG. 3(*b*) is added, test can be effected even if the inspector moves the magnet away immediately after bringing the magnet into close proximity to the reed switch 13.

Figure 3B:
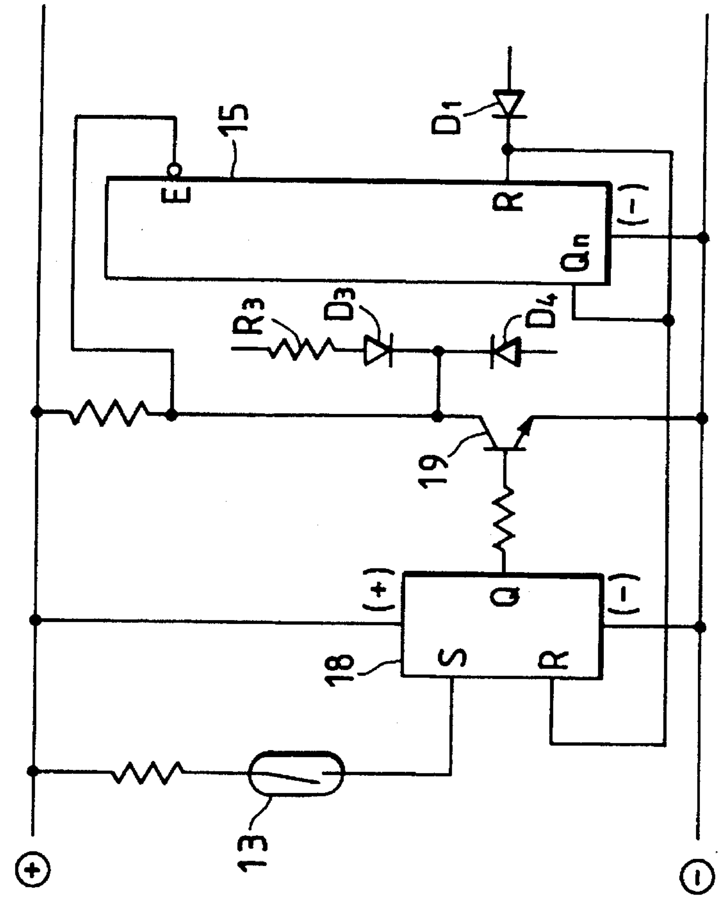
FIGS. 3(*a*) and 3(*b*) are circuit diagrams illustrating an essential portion of a modification of the photoelectric smoke sensor shown in FIG. 1.
Figure 3A:
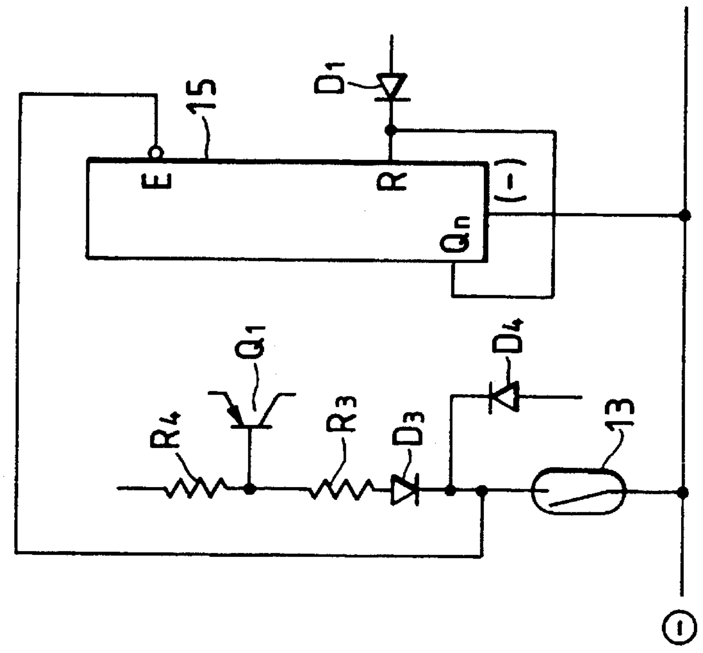

More specifically, FIG. 3(*a*) shows an essential portion of the circuit shown in FIG. 1, in which, when the reed switch 13 is continuously on, the following operations are continued: the shifting operation of the shift register 15, the switching of the frequency of the oscillator circuit 14, the blinking of the light emitting device LED1 for confirming operation, and the blinking and increasing of the quantity of light of the light emitting device LED3 for testing (hereafter, the test operation). In contrast, FIG. 3(*b*) shows the holding circuit, in which, when the reed switch 13 is turned on, an RS flip-flop 18 is set, and a transistor 19 is turned on, to start the above-described test operation. Even if the reed switch 13 is turned off, this state is continued, and when the shift register 15 is shifted to a final stage, the RS flip-flop 18 is reset.

Figure 4:
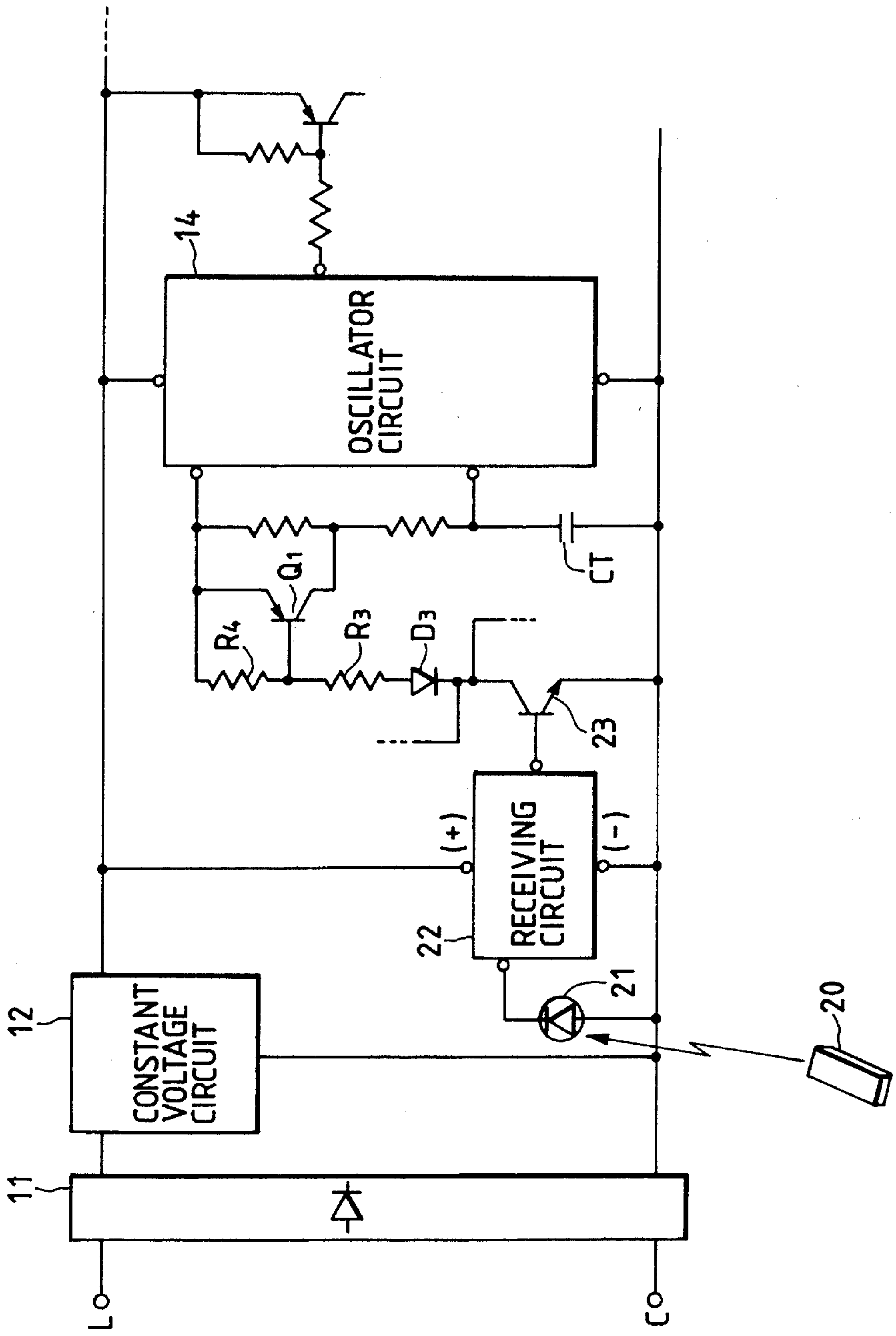
FIG. 4 is a circuit diagram illustrating an example in which test is performed through an infrared remote controller.
Figure 5:
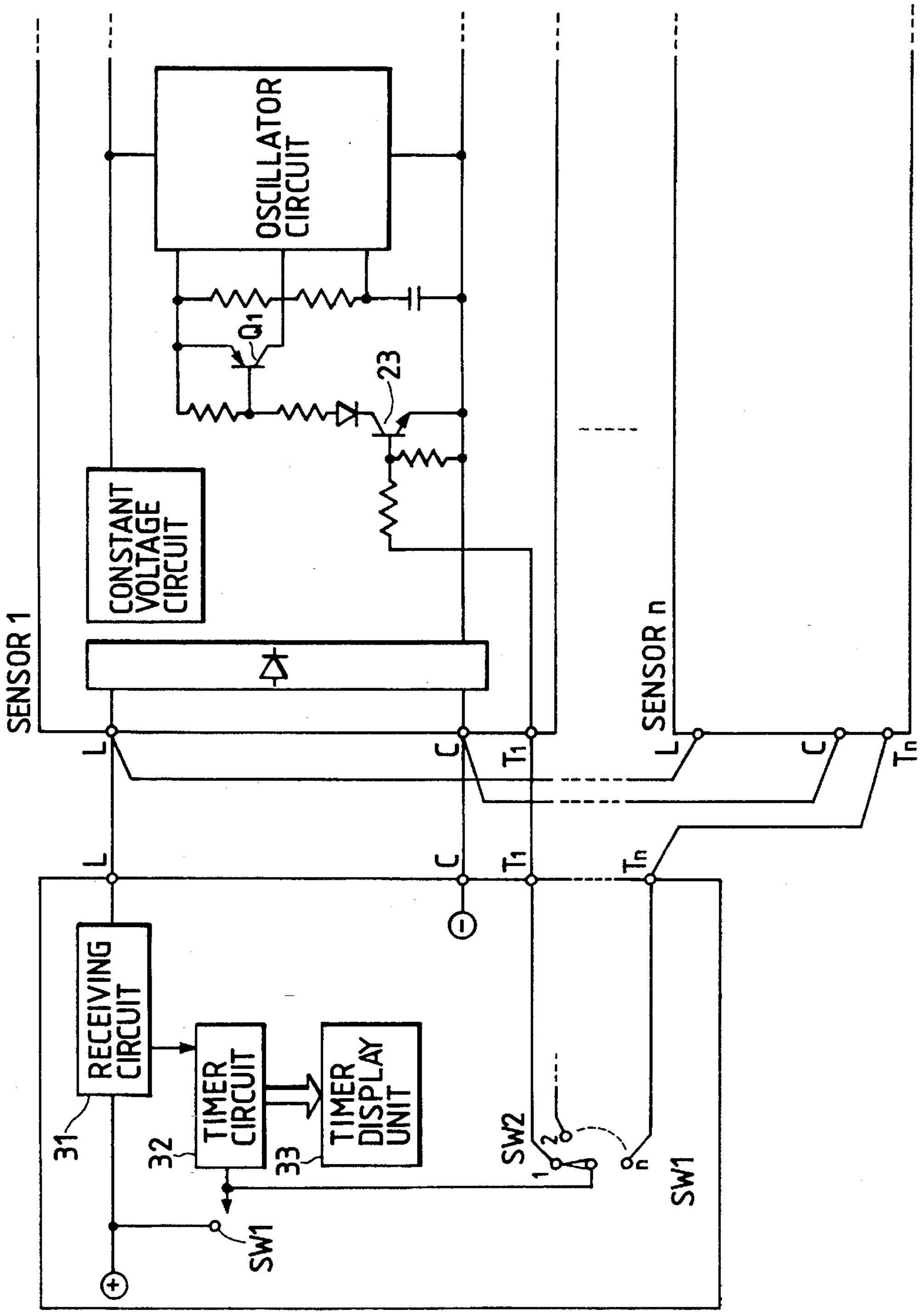
FIG. 5 is a circuit diagram illustrating an example in which test is performed by an external command from a control panel.
Figure 6:
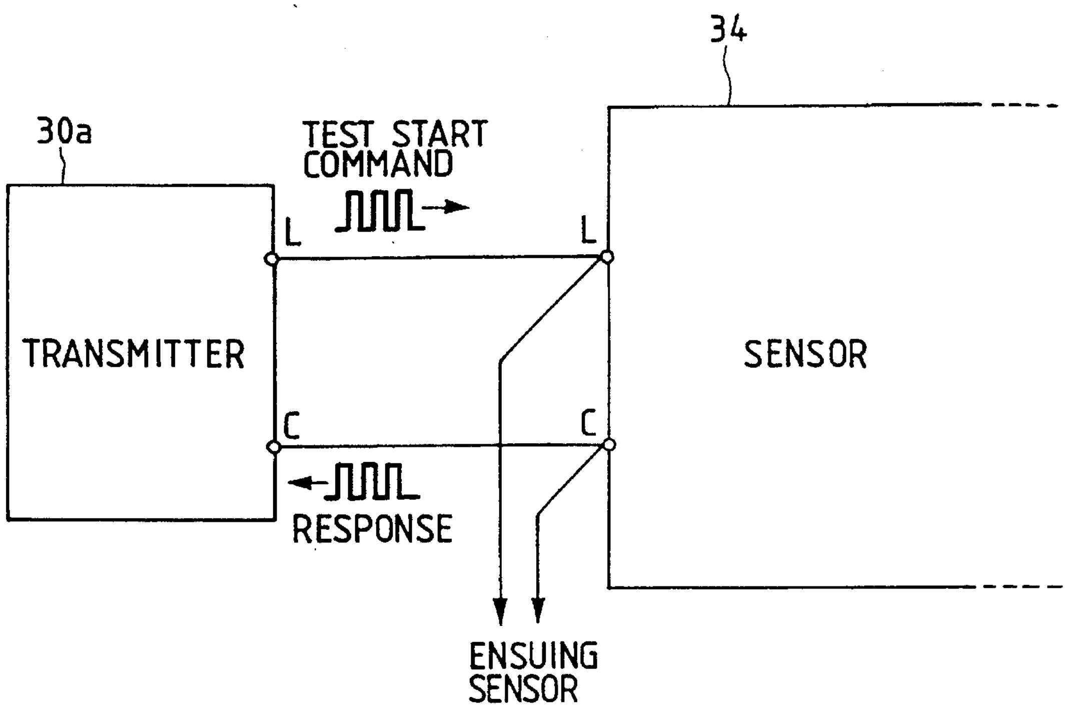
FIG. 6 is a circuit diagram illustrating another example in which test is performed by an external command from the control panel.

In addition, in the present invention, instead of the reed switch 13 and the magnet, an optical switch, such as an LED, or a wireless switch, such as infrared rays, as shown in FIG. 4, or radio waves may be used as the test switch. Still alternatively, as shown in FIGS. 5 and 6, an test command may be transmitted from a control panel to start test, and the time duration up till the issuance of an alarm may be measured on the control panel side, or data on the quantity of light of the light emitting device LED3 for testing during the issuance of the alarm may be received, thereby effecting remote test.

FIG. 4 shows an example in which the inspector starts test by aiming an infrared remote controlled transceiver 20 at the sensor. In this case an test start signal is transmitted from the remote controlled transceiver 20 after being modulated by infrared rays. Instead of the reed switch 13 shown in FIG. 1, an infrared light receiving device 21, a receiving circuit 22 for such as demodulating a received signal, and a transistor starting the aforementioned test operation by a signal from the receiving circuit 22 are provided on the sensor side.

In such a configuration, if the test start signal is not received, in the same way as in FIG. 1, the oscillator circuit 14 oscillates with a relatively long period, and the light emitting device LED2 for smoke detection blinks on and off with this period. Since the shift register 15 is not enabled, the light emitting device LED3 for testing remains turned off.

Then, upon receiving the test start signal, the transistor 23 is turned on, the oscillator circuit 14 oscillates with a relatively short period, and the light emitting device LED2 for smoke detection blinks on and off with this period. Meanwhile, the shift register 15 is set in the enabled state, so that the light emitting device LED3 for testing starts blinking with this period, and the quantity of light emission increases in steps. Incidentally, although the light emitting device LED1 for confirming operation is not shown in FIG. 4, as the inspector visually counts the number of blinking of this light emitting device LED1 in the same way as in FIG. 1, it is possible to inspect whether the sensitivity is within an allowable range. In addition, a non-operation test can also be conducted at the same time.

FIG. 5 shows a fire detecting system in which the transistor 23 for starting the test operation is provided in each of n sensors, and the transistor 23 of each sensor is selectively turned on via a test controlling line (terminals T1 to Tn and a common line C in the drawing) by a control panel 30 instead of the infrared light receiving device 21 and the receiving circuit 22, so as to effect test on the control panel 30 side on the basis of a time duration up till the issuance of an alarm.

In this example, the control panel 30 is provided with an test start switch SW1, a sensor selecting switch SW2, a timer circuit 32, and a timer display unit 33. When the test start switch SW1 is turned on, the timer circuit 32 is started, and a voltage is applied to the transistor 23 of a given sensor via the test start switch SW1, the sensor selecting switch SW2 at its selected position, and the terminal Tn, thereby starting test.

On the sensor side, an alarm signal is outputted after a time duration corresponding to the state of fouling after the starting of the test operation as described before. On the control panel 30 side, therefore, this alarm signal is received by a receiving circuit 31, the timer circuit 32 is stopped upon reception of the alarm signal, and the measured time is displayed by the timer display unit 33, thereby making it possible to inspect the state of fouling of that sensor. Accordingly, in this example, if the test start switch SW1 is turned on in a state in which each of the sensors is sequentially selected by the sensor selecting switch SW2, the inspector is capable of effecting test without going to the places where the sensors are installed.

FIG. 6 shows another example in which test is carried out on the control panel side. This system shows an example in which a transmitter 30*a* and a sensor 34 carry out communication through digital transmission, and during normal monitoring, the control panel 30*a* requests a plurality of sensors 34 to transmit data through a polling system. When test is carried out, an arrangement may be provided such that a test command is transmitted to each sensor 34, and each sensor 34 proceeds to the test mode and issues an alarm to the control panel 30*a*, whereas, on the control panel 30*a* side, after transmission of the test command, the time duration up till the reception of the alarm signal is displayed.

In addition, with such a system, since various data can be transmitted between the control panel 30*a* and the sensor 34, test may be carried out as follows: When the sensor 34 has received a test command, the sensor 34 proceeds to the test mode, and transmits to the control panel 30*a* data on the quantity of light emitted by the light emitting device LED3 for testing at the point of time of the issuance of the alarm, e.g., data indicating which output terminal the shift register 15 shifted to when an alarm was issued (a step value at the time of issuance of an alarm, shown in FIG. 3). A sensitivity test on each sensor 34 in then effected by the control panel 30*a* on the basis of the data on the quantity of light emission.

Figure 10:
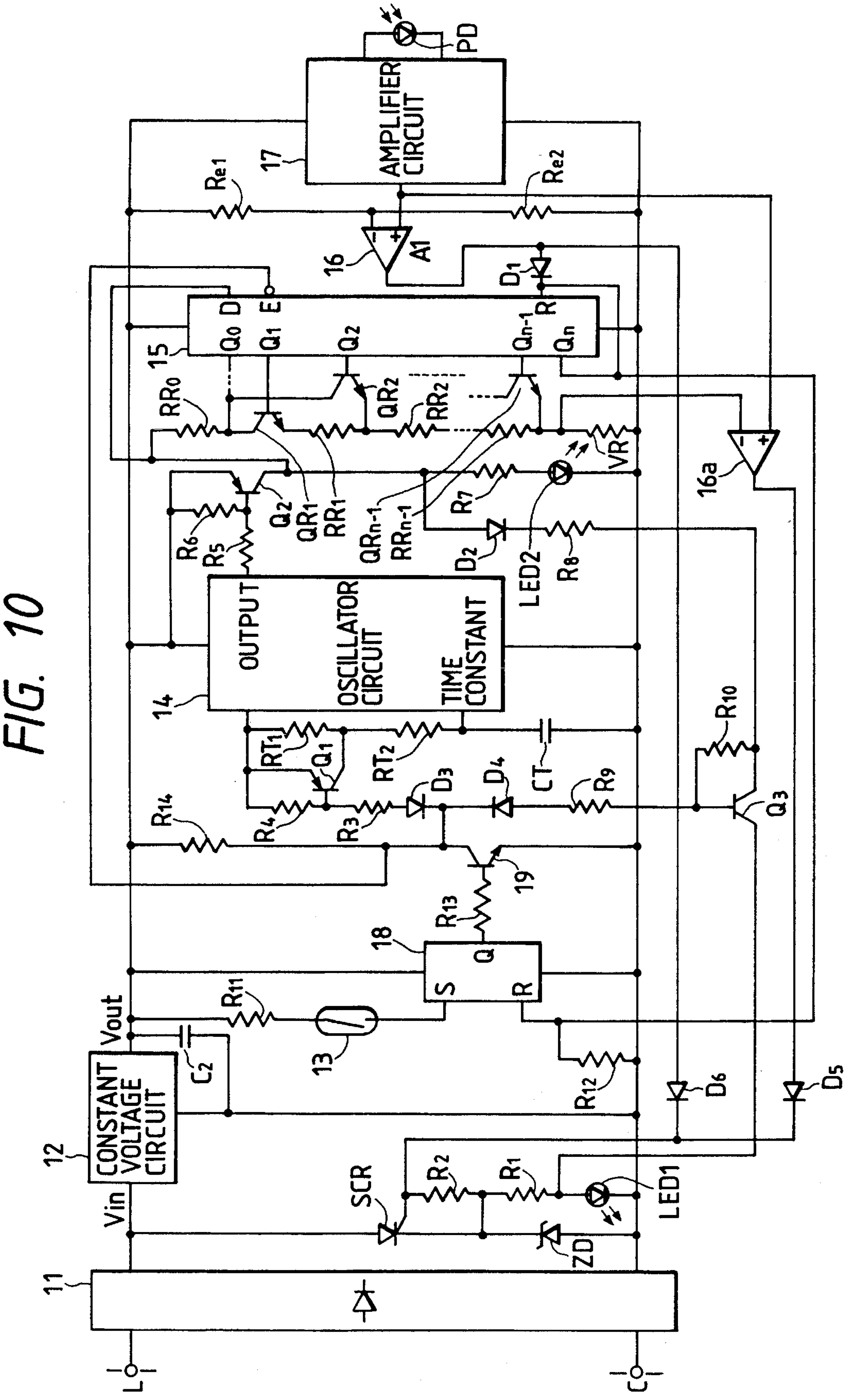
FIG. 10 is a circuit diagram illustrating a photoelectric smoke sensor in accordance with a second embodiment.

Next, referring to FIGS. 10 and 11, a description will be given of a second embodiment. FIG. 10 shows a circuit in which the holding circuit shown in FIG. 3(*b*) is provided in the circuit configuration shown in FIG. 1. In this second embodiment, the light emitting device LED3 for testing is not provided. To explain the holding circuit again, the output terminal (output voltage Vout) of the constant voltage circuit 12 is connected to a set terminal S of the RS flip-flop 18 via a resistor R11 and the reed switch 13 and to the RS flip-flop 18 as a power supply.

In addition, a reset terminal R of the RS flip-flop 18 is connected to – (minus) side of the diode bridge 11 via a resistor R12 and to the output terminal Q'n of the shift register 15. The Q terminal of the RS flip-flop 18 is connected to a base of the transistor 19 via a resistor R13, and a collector of the transistor 19 is connected to the output terminal of the constant voltage circuit 12 via a resistor R14 and to junctions of the diodes D3 and D4.

Next, a description will be given of the circuit configuration which differs from those shown in FIGS. 1 and 3(*b*). In this second embodiment, instead of the light emitting device LED3 for testing, a resistor RR0 is connected between the collector of the transistor Q2 and the collector of the transistor QR1. In addition, a comparator circuit 16*a* is added, and this comparator circuit 16*a* compares the output voltage of the received light amplifier circuit 17 and a reference voltage obtained by dividing the voltage by the variable resistor VR. When the reference voltage is greater than the output voltage of the received light amplifier circuit 17, the comparator circuit 16*a* causes the thyristor SCR to be turned on so as to continuously light up the light emitting device LED1 for confirming operation.

Accordingly, in the same way as in the first embodiment, when the output terminals Q'1 to Q'n-1 of the shift register 15 are successively turned on, a combined resistance value of the ladder resistors RR1 to RRn-2 is reduced in steps. Consequently, when the reference voltage obtained by dividing the voltage by the variable resistor VR increases in steps and becomes greater than or equal to the output voltage of the received light amplifier circuit 17, the output voltage of the comparator circuit 16*a* is set to a high level. An output terminal of the comparator circuit 16*a* is connected between a gate of the thyristor SCR and the resistor R2 via a diode D5, and an output terminal the comparator 16 for issuing an alarm is connected between the gate of the thyristor SCR and the resistor R2 via the diode D5. Since the other configuration is identical, a description thereof will be omitted.

Next, a description will be given of the operation of this second embodiment. First, in the same way as in the first embodiment, in the normal monitoring state in which the reed switch 13 is off, the oscillator circuit 14 oscillates with a relatively long period which is determined by the time constant circuit constituted by the resistors RT1 and RT2 and the capacitor CT. Hence, the transistor Q2 is turned on and off, and the light emitting device LED2 for smoke detection blinks on and off with this period.

Then, when smoke flows into the smoke detection chamber 2 as shown in FIG. 7, the output of the light receiving device PD for smoke detection becomes higher in proportion to an increase in the quantity of scattered light 6 due to the smoke particles 5. When the output exceeds the reference voltage, which is determined by the voltage dividing resistors Re1 and Re2, the output signal of the comparator circuit 16 for issuing an alarm is set to a high level, so that the thyristor SCR is turned on. Accordingly, current flows across the light emitting device LED1 for confirming operation, and this current is detected by the control panel as an alarm signal. Since the thyristor SCR is turned on and Vin becomes a voltage close to zero (approx. 1 V), so that no power is supplied to the constant voltage circuit 12 and thereafter, and the oscillator circuit 14 does not oscillate. Hence, LED1 does not blink.

Next, referring to FIG. 11, a description will be given of test processing in accordance with this second embodiment. In the case of a sensor having proper sensitivity, the 0-point level V0 representing a state in which smoke is not present in the smoke detection chamber 2 (see FIG. 7; in this embodiment, however, a light emitting device LED7 for testing is not provided) is a low value a, as indicated by a solid line. On the other hand, in the case of a sensor having the smoke detection chamber 2 with a fouled interior, the 0-point level V0 is a high value b, as indicated by a broken line.

Accordingly, in the test operation in this embodiment, first, in the same way as in the first embodiment, when the inspector brings a magnet into close proximity to the testing reed switch 13 and the switch 13 is turned on, the transistor Q1 is turned on, so that the resistance value of the time constant circuit is derived from RT2 alone instead of RT1 and RT2. As a result, the period of oscillation of the oscillator circuit 14 becomes shorter. In addition, the transistor Q3 is similarly turned on, and the current also flows across the light emitting device LED1 for confirming operation, so that both this LED1 and the light emitting device LED2 for smoke detection start blinking on and off with this period.

Furthermore, when the shift register 15 is set in an enabled state, and the aforementioned oscillation output is inputted to the clock terminal D, the high level output at the output terminals shifts successively in the order of Q'0, Q'1, Q'2, . . . , Q'n-1, and Q'n. When the output has shifted to the output terminal Q'n, the shift register 15 is reset, and stops the shifting operation.

Then, in this second embodiment, when the shift register 15 undergoes shifts in the above-described manner, the transistors QR1 to QRn-1 are successively turned on. When the reference voltage obtained by dividing the voltage by the variable resistor VR increases in steps, and becomes greater than or equal to the output voltage (i.e., the 0-point level V0) of the received-light amplifier circuit 17, the thyristor SCR is turned on, and the light-emitting device LED1 for confirming operation shifts from a blinking state to a lit state.

Figure 11:
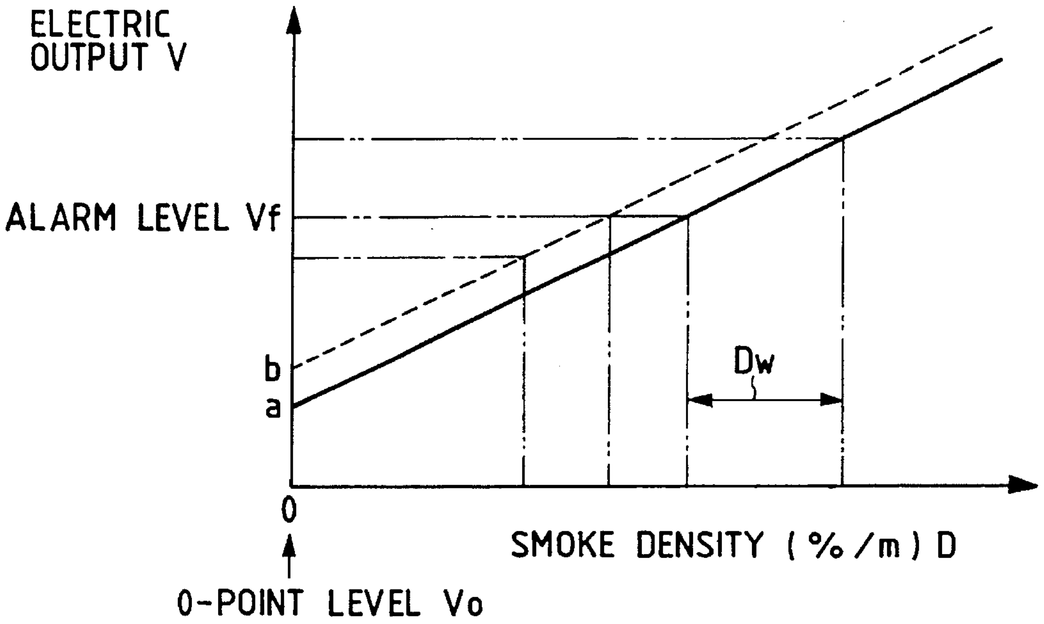
FIG. 11 is an explanatory diagram illustrating the test operation of the photoelectric smoke sensor shown in FIG. 10.

Accordingly, in the sensor having proper sensitively, the number of blinking from a start of blinking until lighting up (i.e., an end of blinking) is relatively small since the 0-point level a is low, as indicated by the solid line in FIG. 11. On the other hand, in the case of the sensor having the smoke detection chamber 2 with a fouled interior, the number of blinking is relative large since the 0-point level b is high, as indicated by the broken line. Accordingly, as the inspector visually counts the number of blinking of the light emitting device LED1 for confirming operation, it is possible to inspect through a single inspecting operation whether the sensitivity is within an allowable range. In addition, the non-operation test can also be conducted at the same time.

In the circuit configuration shown in FIG. 10, the thyristor SCR is turned on when the reference voltage obtained by dividing the voltage by the variable resistor VR increases in steps, and becomes greater than or equal to the output voltage (i.e., the 0-point level V0) of the received light amplifier circuit 17. Therefore, the junctions between the line L and the common line C are set in a state of low impedance, and the state in which an alarm is issued is detected by the unillustrated control panel. To restore the sensor to the proper monitoring state after completion of the above test, the inspector must operate a restoration switch on the control panel side to transmit a restoration signal to the sensor, so that the operation on the control panel side becomes complicated.

Figure 12:
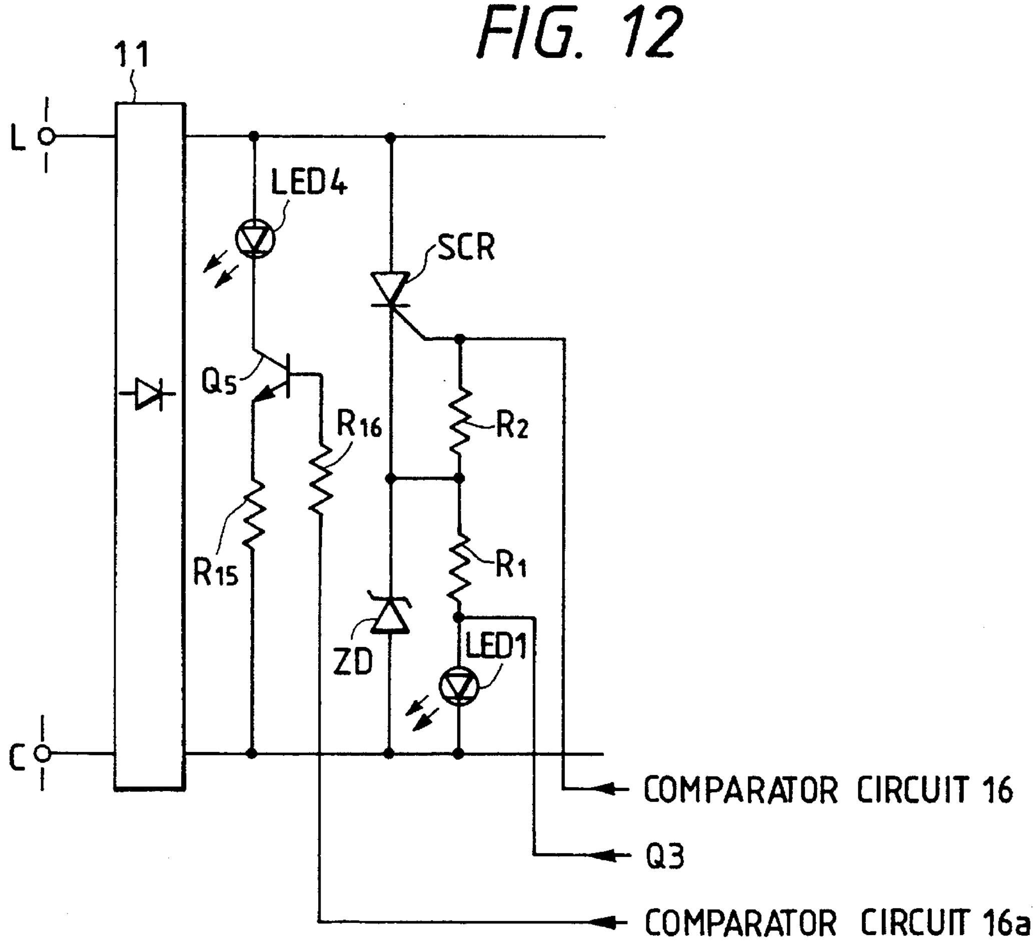
FIG. 12 is a circuit diagram illustrating an essential portion of a modification of the photoelectric smoke sensor shown in FIG. 10.

FIG. 12 shows a circuit of an essential portion which is so designed that it is unnecessary for the control panel side to transmit the restoration signal by prohibiting the outputting of the alarm signal during test. That is, the following arrangement is provided: A series circuit constituted by a light emitting device LED4 for indicating the completion of test, a transistor Q5, and a resistor R15 is connected to the diode bridge 11. The output of the comparator circuit 16*a*, shown in FIG. 10, is applied to the base of the transistor Q5, but is not applied to the thyristor SCR. In this arrangement, when the transistor Q5 is turned on, the junctions between the line L and the common line C are set in an even lower state of impedance than that during the issuance of an alarm, and the control panel side does not detect an alarm signal in this state.

Accordingly, after an test start, when the reference voltage obtained by dividing the voltage by the variable resistor VR increases in steps, and becomes greater than or equal to the output voltage (i.e., the 0-point level V0) of the received light amplifier circuit 17, the thyristor SCR is not turned on. Instead, the transistor Q5 is turned on, and the light emitting device LED4 for indicating the completion of test lights up. Consequently, it is possible to perform test as the inspector visually counts the number of blinking of the light emitting device LED1 for confirming operation up till this lighting up. Incidentally, in this example, the visual operation can be facilitated if light emitting devices which emit different colors of light (e.g., red in the case of the light emitting device LED1 for confirming operation and green in the case of the light emitting device LED4 for indicating the completion of test) are used as the light emitting devices LED1 and LED4.

In addition, also in the second embodiment shown in FIGS. 10 to 12, in the same way as in the first embodiment, instead of the reed switch 13 and the magnet, an optical switch, such as an LED, or a wireless switch, such as infrared rays, as shown in FIG. 4, or radio waves may be used as the test switch. Still alternatively, in the circuit configuration in which an alarm is issued upon completion of test, as shown in FIG. 10, an test command may be transmitted from the control panel to start test, and the time duration up till the issuance of an alarm may be measured on the control panel side, thereby effecting remote test.

Furthermore, the fire detecting system as shown in FIGS. 5 and 6 can be applied to the second embodiment in the same way as in the first embodiment. Since their constitution, operation, function and the like is similar to the fire detecting system applied to the first embodiment, their description is omitted here.

As described above, in accordance with the present invention, there is provided a photoelectric smoke sensor including a light emitting device and a light receiving device for smoke detection for detecting scattered light due to smoke, and a light emitting device for confirming operation which lights up when a quantity of light received by the light receiving device for smoke detection is greater than or equal to a threshold value, the photoelectric smoke sensor comprising: a light emitting device for testing for emitting light to the light receiving device for smoke detection during test; and blinking controlling means for starting the blinking of the light emitting device for confirming operation during an test start, for increasing in steps the quantity of light received by the light emitting device for testing, and for stopping the blinking of the light emitting device for confirming operation when the quantity of light received by the light receiving device for smoke detection is greater than or equal to the threshold value, whereby test is performed by conducting a sensitivity test by visually counting the number of blinking of the light emitting device for confirming operation. Accordingly, in the event that the interior of the smoke detection chamber becomes fouled, and the quantity of light received by the light receiving device for smoke detection increases, the number of blinking of the light emitting device for confirming operation differs from an allowable number of blinking in a normal state. Hence, it is possible to conduct the operation test and the non-operation test in a single test operation, and to conduct the operation test and the non-operation test in detail through a simple operation and in a short time.

In accordance with the present invention, there is also provided a fire detecting system provided with a photoelectric smoke sensor including a light emitting device and a light receiving device for smoke detection for detecting scattered light due to smoke, and a light emitting device for testing for emitting light to the light receiving device for smoke detection during test, wherein an alarm signal is transmitted to a fire alarm control panel when a quantity of light received by the light receiving device for smoke detection is greater than or equal to a threshold value, characterized in that the control panel transmits an test command to the photoelectric smoke sensor, that when the test command is received by the photoelectric smoke sensor, the blinking of the light emitting device for testing is started and a quantity of light emitted by the light emitting device for testing is increased in steps, that the alarm signal is transmitted to the fire alarm control panel when the quantity of light received by the light receiving device for smoke detection is greater than or equal to the threshold value, and that a time duration from the transmission of the test command by the control panel until the reception of the alarm signal by the control panel is measured, so as to effect test by conducting a sensitivity test on the photoelectric smoke sensor.

Accordingly, in the event that the interior of the smoke detection chamber of the sensor becomes fouled, and the quantity of light received by the light receiving device for smoke detection increases, the time duration until the issuance of an alarm differs from a predetermined allowable time duration. Hence, it is possible to conduct the operation test and the non-operation test on a plurality of sensors on the control panel side in a single test operation, and to conduct the operation test and the non-operation test in detail through a simple operation and in a short time.

In accordance with the present invention, there is also provided a fire detecting system provided with a photoelectric smoke sensor including a light emitting device and a light receiving device for smoke detection for detecting scattered light due to smoke, and a light emitting device for testing for emitting light to the light receiving device for smoke detection during test, wherein an alarm signal is transmitted to a fire alarm control panel when a quantity of light received by the light receiving device for smoke detection is greater than or equal to a threshold value, characterized in that the control panel transmits an test command to the photoelectric smoke sensor, that when the test command is received by the photoelectric smoke sensor, a quantity of light emitted by the light emitting device for testing is increased in steps, that data on the quantity of light emitted by the light emitting device for testing when the quantity of light received by the light receiving device for smoke detection is greater than or equal to the threshold value is transmitted to the fire alarm control panel, and that test is performed by the control panel by conducting a sensitivity test on the photoelectric smoke sensor on the basis of the data on the quantity of light emitted. Accordingly, in the event that the interior of the smoke detection chamber of the sensor becomes fouled, and the quantity of light received by the light receiving device for smoke detection increases, the quantity of light received differs from an allowable quantity of light received. Hence, it is possible to conduct the operation test and the non-operation test on a plurality of sensors on the control panel side in a single test operation, and to conduct the operation test and the non-operation test in detail through a simple operation and in a short time.

In accordance with the present invention, there is also provided a photoelectric smoke sensor including a light emitting device and a light receiving device for smoke detection for detecting scattered light due to smoke, and a light emitting device for confirming operation which lights up when a quantity of light received by the light receiving device for smoke detection is greater than or equal to a threshold value, the photoelectric smoke sensor comprising: comparing means for comparing an output voltage of the light receiving device and a reference voltage; a light emitting device for testing for emitting light to the light receiving device for smoke detection during test; and blinking controlling means for starting the blinking of the light emitting device for confirming operation during an test start, for increasing the reference voltage in steps, and for stopping the blinking of the light emitting device for confirming operation in accordance with a result of comparison by the comparing means, whereby test is performed by conducting a sensitivity test by visually counting the number of blinking of the light emitting device for confirming operation. Since the output voltage of the light receiving device, i.e., the 0-point level, differs between a proper sensor and a fouled sensor, the number of blinking differs. Hence, it is possible to conduct the operation test and the non-operation test in a single test operation, and to conduct the operation test and the non-operation test in detail through a simple operation and in a short time.

In accordance with the present invention, there is also provided a photoelectric smoke sensor including a light emitting device and a light receiving device for smoke detection for detecting scattered light due to smoke, and a light emitting device for confirming operation which lights up when a quantity of light received by the light receiving device for smoke detection is greater than or equal to a threshold value, the photoelectric smoke sensor comprising: comparing means for comparing an output voltage of the light receiving device and a reference voltage; alarm signal outputting means for outputting an alarm signal to a control panel when the light emitting device for confirming operation is continuously lit; an test completion indicating device for indicating the completion of test; a light emitting device for testing for emitting light to the light receiving device for smoke detection during test; and blinking controlling means for starting the blinking of the light emitting device for confirming operation during an test start, for increasing the reference voltage in steps, and for lighting up the test completion indicating device and prohibiting an output by the alarm signal outputting means in accordance with a result of comparison by the comparing means, whereby test is performed by conducting a sensitivity test by visually counting the number of blinking of the light emitting device for confirming operation from a blinking start until the lighting up of the test completion indicating device. Since the output voltage of the light receiving device, i.e., the 0-point level, differs between a proper sensor and a fouled sensor, the number of blinking from the start of blinking of the light emitting device for confirming operation until the lighting up of the test completion indicating device differs. Hence, it is possible to conduct the operation test and the non-operation test in a single test operation, and to conduct the operation test and the non-operation test in detail through a simple operation and in a short time. Furthermore, since the output by the alarm signal outputting means is prohibited, it is possible to omit the operation of restoring the sensor on the control panel side after completion of the test.

In accordance with the present invention, there is also provided a fire detecting system provided with a photoelectric smoke sensor including a light emitting device and a light receiving device for smoke detection for detecting scattered light due to smoke, and comparing means for comparing an output voltage of the light receiving device and a reference voltage, wherein the reference voltage is varied in steps during an test start, and an alarm signal is transmitted to a fire alarm control panel in accordance with a result of comparison by the comparing means, characterized in that the control panel transmits an test command to the photoelectric smoke sensor, that when the test command is received by the photoelectric smoke sensor, the reference voltage is varied in steps, that the alarm signal is transmitted to the fire alarm control panel in accordance with the result of comparison by the comparing means, and that a time duration from the transmission of the test command by the control panel until the reception of the alarm signal by the control panel is measured, so as to effect test by conducting a sensitivity test on the photoelectric smoke sensor. Accordingly, in the case of a sensor in which the interior of the smoke detection chamber is fouled and the 0-point level differs, the time duration until the issuance of the alarm differs from a predetermined allowable time duration. Hence, it is possible to conduct the operation test and the non-operation test on each of the plurality of sensors on the control panel side through a single test operation. In addition, it is possible to conduct the operation test and the non-operation test in detail through a simple operation and in a short time.

What is claimed is:

1. A photoelectric smoke sensor comprising:

first light emitting means for emitting light to detect scattered light due to smoke;

first light receiving means for receiving the scattered light due to smoke;

second light emitting means for lighting continuously when a quantity of light received by said light receiving means is equal to or more than a threshold value;

sensitivity test starting means for starting a sensitivity test of said photoelectric smoke sensor;

third light emitting means for blinking with a predetermined period to emit light to said light receiving device;

blinking starting means for starting to blink said second light emitting means when said test is started;

increment means for increasing in steps a quantity of light received by said light receiving means;

comparison means for comparing the threshold value with said quantity of light received by said light receiving means; and lighting continuing means for stopping the blinking of said second light emitting means and to continue the lighting of said second light emitting means when the quantity of light received by said light receiving means is greater than or equal to the threshold value.

2. A photoelectric smoke sensor according to claim 1, wherein said sensitivity test starting means has an inspecting reed switch, and the test is started when an external magnet is brought into close proximity to said testing reed switch.

3. A photoelectric smoke sensor according to claim 2, further comprising holding means for continuing a test operation after the test start.

4. A photoelectric smoke sensor according to claim 1, wherein said sensitivity test starting means has light receiving means, and test is started when external light is made incident upon said light receiving means.

5. A photoelectric smoke sensor according to claim 4, further comprising holding means for continuing a test operation after the test start.

6. A photoelectric smoke sensor according to claim 1, wherein said sensitivity test starting means has a radio wave control panel for test, and test is started when radio waves from the outside are received by said radio wave control panel for test.

7. A photoelectric smoke sensor according to claim 6, further comprising holding means for continuing a test operation after the test start.

8. A photoelectric smoke sensor according to claim 1, further comprising blinking means for causing said first light emitting means to blink with first period during a normal smoke detection, and for causing said first light emitting means and said third light emitting means to blink with second period, said second period being shorter than said first period.

9. A photoelectric smoke sensor according to claim 8, wherein said sensitivity test starting means has an inspecting reed switch, and the test is started when an external magnet is brought into close proximity to said testing reed switch.

10. A photoelectric smoke sensor according to claim 8, wherein said sensitivity test starting means has light receiving means, and test is started when external light is made incident upon said light receiving means.

11. A photoelectric smoke sensor according to claim 8, wherein said sensitivity test starting means has a radio wave control panel for test, and test is started when radio waves from the outside are received by said radio wave control panel for test.

12. A photoelectric smoke sensor according to claim 1, wherein said sensitivity test starting means connected to a control panel of a fire detecting system comprising:

selective starting means for causing said starting means of each of a plurality of photoelectric sensor to start selectively;

time measurement means for measuring a time duration from said selective starting means of selected photoelectric sensor being caused to start until the quantity of light received by said light receiving means becoming greater than or equal to the threshold value;

display means for displaying said time measured by said time measurement means.

13. A photoelectric smoke sensor comprising:

first light emitting means for emitting light to detect scattered light due to smoke;

first light receiving means for receiving the scattered light due to smoke;

first comparison means for comparing a threshold with said quantity of light received by said light emitting means;

second light emitting means for lighting continuously when a quantity of light received by said light receiving means is equal to or more than a threshold;

alarm signal output means for outputting an alarm signal during said second light emitting means lighting continuously;

sensitivity test starting means for starting a sensitivity test of said photoelectric smoke sensor;

blinking starting means for starting to blink said second light emitting means when said test is started;

reference voltage changing means for changing a reference voltage in steps during the sensitivity test;

second comparison means for comparing said reference voltage with a 0-point level voltage of said light receiving means during the sensitivity test; and lighting continuing means for stopping the blinking of said second light emitting means to continue the lighting of said second light emitting means when the reference voltage is greater than or equal to the 0-point level voltage.

14. A photoelectric smoke sensor according to claim 13, further comprising:

test completion indication means for indicating a completion of the sensitivity test when the reference voltage is greater than or equal to the 0-point level voltage during the sensitive test; and prohibiting means for preventing a lighting continuously of said second light emitting means to continue the blinking in order to prohibit an output of the alarm signal from said alarm signal output means.

15. A photoelectric smoke sensor according to claim 14, wherein said second light emitting means and said test completion indication means emit light of different colors.

16. A photoelectric smoke sensor according to claim 14, further comprising blinking means for causing said first light emitting means to blink with first period during a normal smoke detection, and for causing said first light emitting means and said third light emitting means to blink with second period, said second period being shorter than said first period.

17. A photoelectric smoke sensor according to claim 13, further comprising blinking means for causing said first light emitting means to blink with first period during a normal smoke detection, and for causing said first light emitting means and said third light emitting means to blink with second period, said second period being shorter than said first period.

18. A photoelectric smoke sensor according to claim 13, wherein said sensitivity test starting means connected to a control panel of a fire detecting system comprising:

selective starting means for causing said starting means of each of a plurality of photoelectric sensor to start selectively;

time measurement means for measuring a time duration from said selective starting means of selected photoelectric sensor being caused to start until the quantity of light received by said light receiving means becoming greater than or equal to the threshold value;

display means for displaying said time measured by said time measurement means.

19. A sensitivity testing method for a photoelectric smoke sensor of a fire detecting system, said system having a plurality of photoelectric smoke sensors each of which includes a light emitting device and light receiving device for detecting scattered light due to smoke and a test light emitting device for emitting light to said light receiving device during the sensitivity test, and a control panel for controlling said plurality of sensors, said method comprising the steps of:

selecting one sensor to which a sensitivity test is conducted from said plurality of sensors;

transmitting a test command from said control panel to said selected one sensor;

increasing in steps a quantity of light emitted by said light emitting device when said test command is received by said sensor;

transmitting an alarm signal from said sensor to said control panel when a quantity of light received by said light receiving device is greater than or equal to a threshold;

measuring a time duration from the transmission of the test command by said control panel until the reception of the alarm signal by said control panel; and conducting the sensitivity test of said sensor based on the measured time in said control panel.

20. A sensitivity testing method according to claim 19, further comprising the steps of displaying said time duration measured by said time measurement device from the transmission of the test command by said control panel until the reception of the alarm signal by said control panel.

21. A sensitivity testing method for a photoelectric smoke sensor of a fire detecting system, said system having a plurality of photoelectric smoke sensors each of which includes a light emitting device and light receiving device for detecting scattered light due to smoke and a test light emitting device for emitting light to said light receiving device during the sensitivity test, and a control panel for controlling said plurality of sensors, said method comprising the steps of:

transmitting a test command from said control panel to each of said sensors;

increasing in steps a quantity of light emitted by said light emitting device when said test command is received by said sensor;

transmitting an emitting light quantity data of said test light emitting device at a point of time when the receiving quantity of said light receiving device is greater than or equal to a threshold from said sensor to said control panel; and conducting the sensitivity test of said sensor based on the emitting light quantity data in said control panel.

22. A sensitivity testing method for a photoelectric smoke sensor of a fire detecting system, said system having a plurality of photoelectric smoke sensors each of which includes a light emitting device and light receiving device for detecting scattered light due to smoke and comparison means for comparing a 0-point level voltage of said light receiving device with a reference voltage, and a control panel for controlling said plurality of sensors, said method comprising the steps of:

selecting one sensor to which a sensitivity test is conducted from said plurality of sensors;

transmitting a test command from said control panel to said selected one sensor;

changing in steps the reference voltage when said test command is received by said sensor;

transmitting an alarm signal from said sensor to said control panel based on a result of the comparison of said comparison means;

measuring a time duration from the transmission of the test command by said control panel until the reception of the alarm signal by said control panel; and conducting the sensitivity test of said sensor based on the measured time in said control panel.

23. A sensitivity testing method according to claim 22, further comprising the steps of displaying said time duration measured by said time measurement device from the transmission of the test command by said control panel until the reception of the alarm signal by said control panel.

* * * * *